United States Patent
Noguchi et al.

(10) Patent No.: US 8,927,641 B2
(45) Date of Patent: Jan. 6, 2015

(54) THERMOSETTING RESIN COMPOSITION AND METHOD OF PRODUCING THE SAME

(75) Inventors: Toru Noguchi, Ueda (JP); Akira Magario, Ueda (JE)

(73) Assignee: Nissin Kogyo Co., Ltd., Ueda-shi (JP)

( * ) Notice: Subject to any disclaimer, the term of this patent is extended or adjusted under 35 U.S.C. 154(b) by 991 days.

(21) Appl. No.: 12/840,025

(22) Filed: Jul. 20, 2010

(65) Prior Publication Data

US 2010/0286309 A1 Nov. 11, 2010

Related U.S. Application Data

(62) Division of application No. 11/594,955, filed on Nov. 9, 2006, now abandoned.

(30) Foreign Application Priority Data

Nov. 11, 2005 (JP) .................................. 2005-327404
Mar. 24, 2006 (JP) .................................. 2006-82871

(51) Int. Cl.
| | | |
|---|---|---|
| *C08L 63/00* | (2006.01) | |
| *B82Y 30/00* | (2011.01) | |
| *C08G 59/40* | (2006.01) | |
| C08K 3/04 | (2006.01) | |
| C08K 7/06 | (2006.01) | |
| C08K 9/08 | (2006.01) | |
| C08L 63/08 | (2006.01) | |

(52) U.S. Cl.
CPC ............. *B82Y 30/00* (2013.01); *C08G 59/4035* (2013.01); *C08L 63/00* (2013.01); *C08K 3/04* (2013.01); *C08K 7/06* (2013.01); *C08K 9/08* (2013.01); *C08L 63/08* (2013.01)

USPC .......................................................... 524/495

(58) Field of Classification Search
CPC ..... B82Y 30/00; C08G 59/4035; C08L 63/00
USPC ................ 428/292.1, 295.1, 297.4, 364, 492; 523/400, 427, 436, 440; 524/474, 495, 524/496, 500, 847; 977/734, 742, 743, 744, 977/750, 751, 752, 753

See application file for complete search history.

(56) References Cited

U.S. PATENT DOCUMENTS

| | | |
|---|---|---|
| 3,943,090 A | 3/1976 | Enever |
| 5,591,382 A | 1/1997 | Nahass et al. |

(Continued)

FOREIGN PATENT DOCUMENTS

| | | |
|---|---|---|
| EP | 1 466 940 A1 | 10/2004 |
| JP | T-08-508534 | 10/1996 |

(Continued)

OTHER PUBLICATIONS

Notification of Reasons for Refusal dated Jul. 21, 2010 with English translation.

(Continued)

*Primary Examiner* — Ling Choi
*Assistant Examiner* — Lanee Reuther
(74) *Attorney, Agent, or Firm* — Oliff PLC

(57) ABSTRACT

A thermosetting resin composition including: a matrix including a thermosetting resin and an elastomer; and carbon nanofibers dispersed in the matrix. The elastomer includes an unsaturated bond or a group having affinity to the carbon nanofibers.

10 Claims, 2 Drawing Sheets

(56) References Cited

U.S. PATENT DOCUMENTS

| | | |
|---|---|---|
| 5,643,502 A | 7/1997 | Nahass et al. |
| 5,651,922 A | 7/1997 | Nahass et al. |
| 5,726,216 A * | 3/1998 | Janke et al. ............ 522/31 |
| 2004/0241440 A1 * | 12/2004 | Noguchi et al. ............ 428/364 |
| 2005/0075443 A1 | 4/2005 | Noguchi et al. |
| 2005/0171269 A1 | 8/2005 | Hu et al. |
| 2005/0191490 A1 | 9/2005 | Ton-That et al. |
| 2006/0062986 A1 | 3/2006 | Magario et al. |
| 2006/0079627 A1 | 4/2006 | Noguchi et al. |
| 2006/0214560 A1 | 9/2006 | Noguchi et al. |

FOREIGN PATENT DOCUMENTS

| | | |
|---|---|---|
| JP | A 2004-161886 | 6/2004 |
| JP | A-2004-338327 | 12/2004 |
| JP | A 2005-068386 | 3/2005 |
| JP | A-2007-126637 | 5/2007 |
| KR | 10-2003-0036887 A | 5/2003 |
| KR | 10-2005-0012181 A | 1/2005 |
| WO | WO 00/64668 A1 | 11/2000 |
| WO | WO 03/080513 A2 | 10/2003 |

OTHER PUBLICATIONS

U.S. Appl. No. 11/385,670, in the name of Toru Noguchi et al, filed Mar. 22, 2006.

U.S. Appl. No. 11/475,032, in the name of Toru Noguchi et al, filed Jun. 27, 2006.

U.S. Appl. No. 11/475,033, in the name of Toru Noguchi et al, filed Jun. 27, 2006.

U.S. Appl. No. 11/594,933, in the name of Toru Noguchi et al, filed Nov. 9, 2006.

Hwang, D. G. et al., "Artificial Intelligence Heat Absorbing/Radiating Engineering Plastic," Database WPI Week 200414, Derwent Publications Ltd., XP-002430929 (2003).

Liu, Luqi et al., "Rubbery and Glassy Epoxy Resins Reinforced with Carbon Nanotubes," Composites Science and Technology, Elsevier, vol. 65, pp. 1861-1868 (Sep. 2005).

Epikote Resin 862 Product Bulletin, Resolution Performance Products, Sep. 2002.

Epikote Resin 828 Starting Formulation No. 8024, Resolution Performance Products, Nov. 2001.

www.elastoproxy.com/pages/support/rubber_dictionary.aspx?LANG=En-CA&letter=M, 2006.

www.bloomerplastics.com/capabilities-glossary.html, 2009.

http://en.wiktionary.org/wiki/masterbatch, Dec. 16, 2009, at 16:46.

Lewis, Hawley's Condensed Chemical Dictionary (14$^{th}$ Edition), John Wiley & Sons, p. Online version available at: http://knovel.com/web/portal/browse/display?_EXT_KNOVEL_DISPLAY_bookid=704&VerticalID=0.

* cited by examiner

THERMOSETTING RESIN COMPOSITION AND METHOD OF PRODUCING THE SAME

This is a divisional of application Ser. No. 11/594,955 filed Nov. 9, 2009, and claims the benefit of Japanese Patent Application No. 2005-327404, filed on Nov. 11, 2005, and Japanese Patent Application No. 2006-82871, filed on Mar. 24, 2006. The entire disclosure of the prior applications are hereby incorporated by reference in their entirety.

BACKGROUND OF THE INVENTION

The present invention relates to a thermosetting resin composition and a method of producing the same.

A composite material has been generally provided with physical properties corresponding to the application by combining a matrix material and reinforcing fibers or reinforcing particles. In particular, in the fields of semiconductor manufacturing instruments, optical instruments, microfabrication instruments, and the like, a reduction in the effects of the thermal expansion of parts has been demanded. Therefore, composite materials using various reinforcing fibers such as carbon fibers have been proposed (see WO00/64668, for example).

The inventors of the invention have proposed a carbon fiber composite material in which carbon nanofibers are uniformly dispersed in an elastomer (see JP-A-2005-68386, for example). In such a carbon fiber composite material, the dispersibility of the carbon nanofibers with strong aggregating properties is improved by mixing the elastomer with the carbon nanofibers.

However, technology of uniformly dispersing the carbon nanofibers in a thermosetting resin has not yet been established.

SUMMARY

According to a first aspect of the invention, there is provided a method of producing a thermosetting resin composition comprising:

(a) mixing carbon nanofibers into an elastomer including an unsaturated bond or a group having affinity to the carbon nanofibers, and dispersing the carbon nanofibers by applying a shear force to obtain a composite elastomer; and (b) mixing the composite elastomer and a thermosetting resin.

According to a second aspect of the invention, there is provided a method of producing a thermosetting resin composition comprising:

(c) mixing a thermosetting resin and an elastomer including an unsaturated bond or a group having affinity to carbon nanofibers; and (d) mixing carbon nanofibers into the mixture of the thermosetting resin and the elastomer, and dispersing the carbon nanofibers by applying a shear force.

According to a third aspect of the invention, there is provided a thermosetting resin composition obtained by any of the above-described methods.

According to a fourth aspect of the invention, there is provided a thermosetting resin composition comprising:

a matrix including a thermosetting resin and an elastomer; and carbon nanofibers dispersed in the matrix, the elastomer including an unsaturated bond or a group having affinity to the carbon nanofibers.

DETAILED DESCRIPTION OF THE EMBODIMENT

Figure 1:
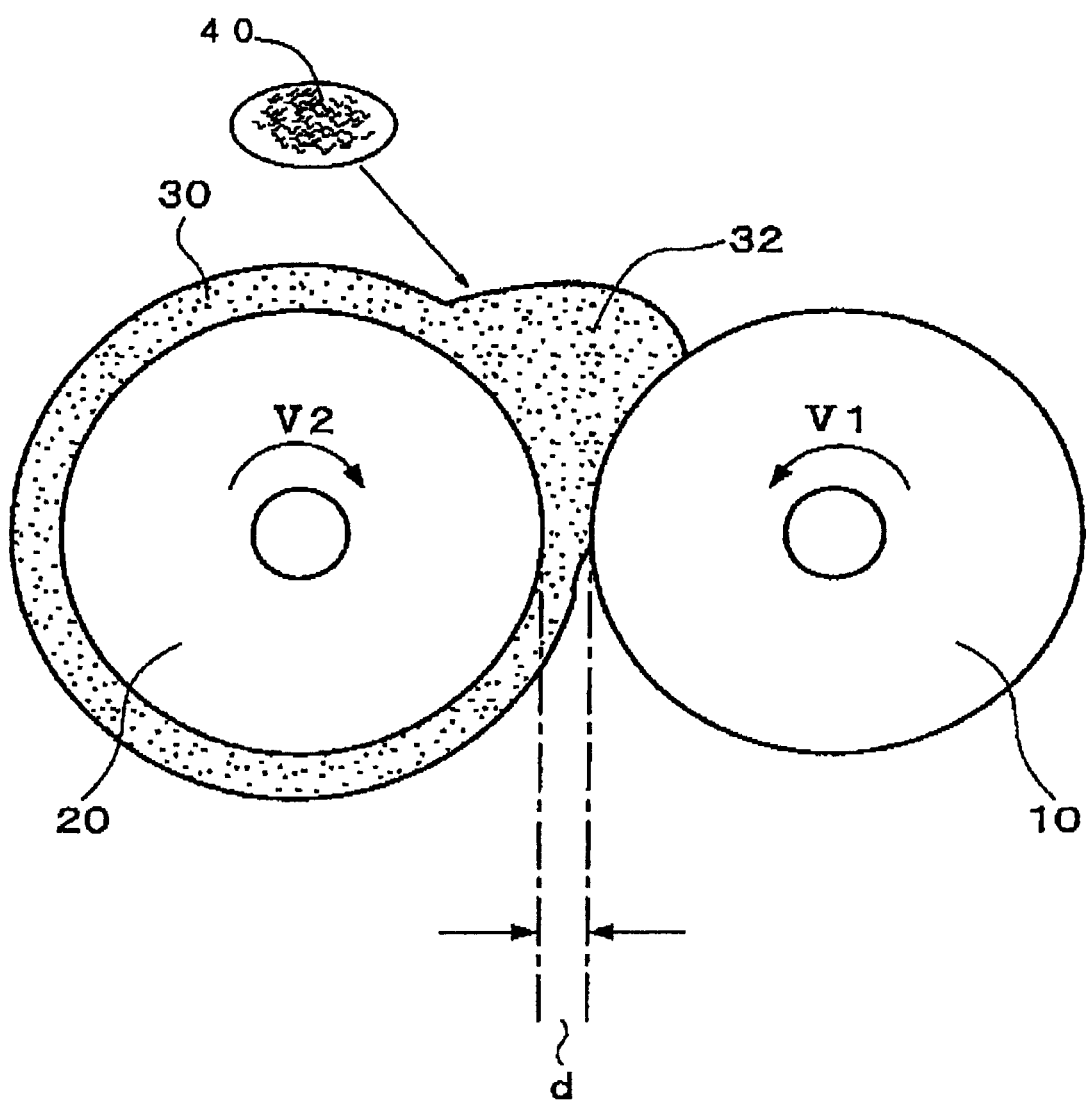
FIG. 1 is a view schematically showing a method of mixing an elastomer and carbon nanofibers utilizing an open-roll method according to one embodiment of the invention.

The invention may provide a thermosetting resin composition in which carbon nanofibers are dispersed, and a method of producing the same.

According to one embodiment of the invention, there is provided a method of producing a thermosetting resin composition comprising:

(a) mixing carbon nanofibers into an elastomer including an unsaturated bond or a group having affinity to the carbon nanofibers, and dispersing the carbon nanofibers by applying a shear force to obtain a composite elastomer; and (b) mixing the composite elastomer and a thermosetting resin.

According to the method of producing a thermosetting resin composition according to this embodiment, a thermosetting resin composition in which the carbon nanofibers are uniformly dispersed can be easily obtained by mixing the composite elastomer, in which the carbon nanofibers are uniformly dispersed, with the thermosetting resin.

According to one embodiment of the invention, there is provided a method of producing a thermosetting resin composition comprising:

(c) mixing a thermosetting resin and an elastomer including an unsaturated bond or a group having affinity to carbon nanofibers; and (d) mixing carbon nanofibers into the mixture of the thermosetting resin and the elastomer, and dispersing the carbon nanofibers by applying a shear force.

According to the method of producing a thermosetting resin composition according to this embodiment, the thermosetting resin can be provided with the elasticity of the elastomer by obtaining the mixture of the thermosetting resin and the elastomer, and a thermosetting resin composition in which the carbon nanofibers are uniformly dispersed can be easily obtained. In order to disperse the carbon nanofibers in the matrix, the matrix material must exhibit viscosity, elasticity, and polarity. The thermosetting resin and the elastomer exhibit viscosity. The elastomer exhibits elasticity. With regard to the polarity, the elastomer includes an unsaturated bond or a group having affinity to the carbon nanofibers. Therefore, the carbon nanofibers can be relatively easily dispersed in the thermosetting resin composition.

In this method of producing a thermosetting resin composition, the carbon nanofibers may have an average diameter of 0.5 to 500 nm.

In this method of producing a thermosetting resin composition, a network component of the elastomer in an uncrosslinked form may have a spin-spin relaxation time (T2n) measured at 30° C. by a Hahn-echo method using a pulsed nuclear magnetic resonance (NMR) technique of 100 to 3,000 microseconds.

In this method of producing a thermosetting resin composition, the thermosetting resin may be an epoxy resin; and
the elastomer may be an epoxidized elastomer.

According to this configuration, since the epoxidized elastomer and the epoxy resin include an epoxy group having particularly excellent affinity to the carbon nanofibers, the carbon nanofibers can be uniformly dispersed in the thermosetting resin composition.

According to one embodiment of the invention, there is provided a thermosetting resin composition comprising:
a matrix including a thermosetting resin and an elastomer; and
carbon nanofibers dispersed in the matrix,
the elastomer including an unsaturated bond or a group having affinity to the carbon nanofibers.

In the thermosetting resin composition according to this embodiment, the carbon nanofibers are uniformly dispersed in the matrix.

In this thermosetting resin composition,
content of the elastomer in a polymer component formed of the elastomer, the thermosetting resin, and a curing agent for the thermosetting resin in the thermosetting resin composition may be 10 to 40 wt %.

This provides a rigid thermosetting resin composition in which the carbon nanofibers are uniformly dispersed. If the content of the elastomer in the thermosetting resin composition is less than 10 wt %, the dispersion of the carbon nanofiber becomes insufficient. If the content of the elastomer exceeds 40 wt %, the rigidity of the thermosetting resin composition is decreased.

In this thermosetting resin composition,
the thermosetting resin may be an epoxy resin; and
the elastomer may be an epoxidized elastomer.

The thermosetting resin composition may have a dynamic modulus of elasticity (E') at 30° C. of 20 to 30 GPa.

This provides a thermosetting resin composition with a high rigidity similar to that of a metal structural material. Moreover, use of the epoxy resin enables the thermosetting resin composition to be molded into a desired shape at a low temperature in a short time in comparison with a metal material, whereby cost of the production process can be reduced. Moreover, a reduction in weight can be achieved.

The thermosetting resin composition may have an elongation at break of 4% or more.

This provides a flexible thermosetting resin composition with a high rigidity similar to that of a metal material.

The elastomer according to this embodiment may be a rubber elastomer or a thermoplastic elastomer. As the raw material elastomer, an uncrosslinked form is used when using a rubber elastomer.

Embodiments of the invention are described below in detail with reference to the drawings.

As examples of a method of producing a thermosetting resin composition according to this embodiment, the following two methods can be given.

(1) A method of producing a thermosetting resin composition according to this embodiment includes: (a) mixing carbon nanofibers into an elastomer including an unsaturated bond or a group having affinity to the carbon nanofibers, and dispersing the carbon nanofibers by applying a shear force to obtain a composite elastomer; and (b) mixing the composite elastomer and a thermosetting resin.

(2) Another method of producing a thermosetting resin composition according to this embodiment includes: (c) mixing a thermosetting resin and an elastomer including an unsaturated bond or a group having affinity to carbon nanofibers; and (d) mixing carbon nanofibers into the mixture of the thermosetting resin and the elastomer, and dispersing the carbon nanofibers by applying a shear force.

A thermosetting resin composition according to this embodiment includes a matrix including a thermosetting resin and an elastomer, and carbon nanofibers dispersed in the matrix, the elastomer including an unsaturated bond or a group having affinity to the carbon nanofibers.

The thermosetting resin and the elastomer are described below.

As the thermosetting resin, a thermosetting resin which is generally used and exhibits excellent mutual solubility with the selected elastomer may be appropriately selected. As examples of the thermosetting resin, polycondensed or addition-condensed resins such as a phenol resin, an amino resin, an epoxy resin, a silicone resin, a thermosetting polyimide resin, and a thermosetting polyurethane resin, addition-polymerized resins such as a thermosetting acrylic resin, a vinyl ester resin, an unsaturated polyester resin, and a diallyl phthalate resin, and the like can be given. These thermosetting resins may be used either individually or in combination of two or more. As a curing agent for the thermosetting resin, a known curing agent may be appropriately selected corresponding to the thermosetting resin selected depending on the application.

In order to mix the carbon nanofibers into the matrix material and disperse the carbon nanofibers, the matrix material is required to exhibit polarity for ensuring adsorption on the carbon nanofibers, viscosity and flowability for entering the space between the aggregated carbon nanofibers, and elasticity for refining (disentangling) the carbon nanofibers due to strong shear force to uniformly disperse the carbon nanofibers. Therefore, it is preferable that the thermosetting resin include a polar group. It is preferable to use the elastomer as an elastic component in order to satisfy the above elasticity requirement.

As the thermosetting resin including a polar group, it is preferable to use an epoxy resin having an epoxy group having excellent affinity to the carbon nanofibers. The epoxy resin is not particularly limited insofar as the epoxy resin is generally industrially used. As examples of a typical epoxy resin, epoxy resins having two or more epoxy groups in the molecule such as a bisphenol A type epoxy resin produced from bisphenol A, a bisphenol F type epoxy resin produced from bisphenol F, and a bisphenol S type epoxy resin produced from bisphenol S can be given. As a curing agent for the epoxy resin, a curing agent generally industrially used may be appropriately selected. As examples of the curing agent, an amine curing agent, an acid anhydride curing agent, and the like can be given.

The thermosetting resin such as the epoxy resin is liquid at a temperature employed in the step of mixing the thermosetting resin and the elastomer and does not exhibit elasticity, differing from the elastomer, although the thermosetting resin exhibits viscosity. Therefore, even if the carbon nanofibers are mixed into the thermosetting resin, the carbon nanofibers cannot be dispersed. For example, when using an epoxidized elastomer as the elastomer, since the epoxy resin exhibits excellent mutual solubility with the epoxidized elastomer, the mixture can be made uniform over the entire mixture in the mixing step. Therefore, the carbon nanofibers adsorbed through the epoxy group (polarity) can be dispersed by utilizing the elasticity of the elastomer.

As the elastomer, an elastomer which provides the thermosetting resin with rubber elasticity and exhibits excellent mutual solubility with the selected thermosetting resin may be appropriately selected. The elastomer has a molecular weight of preferably 5,000 to 5,000,000, and still more preferably 20,000 to 3,000,000. If the molecular weight of the elastomer is within this range, since the elastomer molecules are entangled and linked, the elastomer exhibits excellent elasticity for dispersing the carbon nanofibers. Since the elastomer exhibits viscosity, the elastomer easily enters the space between the aggregated carbon nanofibers. Moreover, since the elastomer exhibits elasticity, the carbon nanofibers can be separated. If the molecular weight of the elastomer is less than 5,000, since the elastomer molecules cannot be entangled sufficiently, the effect of dispersing the carbon nanofibers is reduced due to low elasticity, even if a shear force is applied in the subsequent step. If the molecular weight of the elastomer is greater than 5,000,000, the elastomer becomes too hard so that processing becomes difficult.

The network component of the elastomer in an uncrosslinked form has a spin-spin relaxation time (T2n/30° C.), measured at 30° C. by a Hahn-echo method using a pulsed nuclear magnetic resonance (NMR) technique, of preferably 100 to 3,000 microseconds, and still more preferably 200 to 1,000 microseconds. If the elastomer has a spin-spin relaxation time (T2n/30° C.) within the above range, the elastomer is flexible and has a sufficiently high molecular mobility. That is, the elastomer exhibits appropriate elasticity for dispersing the carbon nanofibers. Moreover, since the elastomer exhibits viscosity, the elastomer can easily enter the space between the carbon nanofibers due to high molecular mobility when mixing the elastomer and the carbon nanofibers. If the spin-spin relaxation time (T2n/30° C.) is shorter than 100 microseconds, the elastomer cannot have a sufficient molecular mobility. If the spin-spin relaxation time (T2n/30° C.) is longer than 3,000 microseconds, since the elastomer tends to flow as a liquid, it becomes difficult to disperse the carbon nanofibers due to low elasticity.

The network component of the elastomer in a crosslinked form preferably has a spin-spin relaxation time (T2n) measured at 30° C. by the Hahn-echo method using the pulsed NMR technique of 100 to 2,000 microseconds. The reasons therefor are the same as those described for the uncrosslinked form. Specifically, when crosslinking the uncrosslinked form satisfying the above conditions, the spin-spin relaxation time (T2n) of the resulting crosslinked form almost falls within the above range.

The spin-spin relaxation time obtained by the Hahn-echo method using the pulsed NMR technique is a measure which indicates the molecular mobility of a substance. In more detail, when measuring the spin-spin relaxation time of the elastomer by the Hahn-echo method using the pulsed NMR technique, a first component having a shorter first spin-spin relaxation time (T2n) and a second component having a longer second spin-spin relaxation time (T2nn) are detected. The first component corresponds to the network component (backbone molecule) of the polymer, and the second component corresponds to the non-network component (branched component such as terminal chain) of the polymer. The shorter the first spin-spin relaxation time, the lower the molecular mobility and the harder the elastomer. The longer the first spin-spin relaxation time, the higher the molecular mobility and the softer the elastomer.

As the measurement method in the pulsed NMR technique, a solid-echo method, a Carr-Purcell-Meiboom-Gill (CPMG) method, or a 90-degree pulse method may be applied instead of the Hahn-echo method. Since the elastomer according to the invention has a medium spin-spin relaxation time (T2), the Hahn-echo method is most suitable. In general, the solid-echo method and the 90-degree pulse method are suitable for measuring a short spin-spin relaxation time (T2), the Hahn-echo method is suitable for measuring a medium spin-spin relaxation time (T2), and the CPMG method is suitable for measuring a long spin-spin relaxation time (T2).

At least one of the main chain, side chain, and terminal chain of the elastomer includes an unsaturated bond or a group having affinity to the carbon nanofiber, particularly to a terminal radical of the carbon nanofiber, or the elastomer has properties of readily producing such a radical or group. The unsaturated bond or group may be at least one unsaturated bond or group selected from a double bond, a triple bond, and functional groups such as alpha-hydrogen, a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group. In particular, the epoxy group exhibits excellent affinity to the carbon nanofiber.

The carbon nanofiber generally has a structure in which the side surface is formed of a six-membered ring of carbon atoms and the end is closed by introduction of a five-membered ring. However, since the carbon nanofiber has a forced structure, a defect tends to occur, so that a radical or a functional group tends to be formed at the defect. In this embodiment, since at least one of the main chain, side chain, and terminal chain of the elastomer includes an unsaturated bond or a group having high affinity (reactivity or polarity) to the radical of the carbon nanofiber, the elastomer and the carbon nanofiber can be bonded. This enables the carbon nanofibers to be easily dispersed by overcoming the aggregating force of the carbon nanofibers. When mixing the elastomer and the carbon nanofibers, free radicals produced due to breakage of the elastomer molecules attack the defects of the carbon nanofibers to produce free radicals on the surfaces of the carbon nanofibers.

As the elastomer, an elastomer such as natural rubber (NR), epoxidized natural rubber (ENR), styrene-butadiene rubber (SBR), nitrile rubber (NBR), chloroprene rubber (CR), ethylene propylene rubber (EPR or EPDM), butyl rubber (IIR), chlorobutyl rubber (CIIR), acrylic rubber (ACM), silicone rubber (Q), fluorine rubber (FKM), butadiene rubber (BR), epoxidized butadiene rubber (EBR), epichlorohydrin rubber (CO or CEO), urethane rubber (U), or polysulfide rubber (T); a thermoplastic elastomer such as an olefin-based elastomer (TPO), poly(vinyl chloride)-based elastomer (TPVC), polyester-based elastomer (TPEE), polyurethane-based elastomer (TPU), polyamide-based elastomer (TPEA), or styrene-based elastomer (SBS); or a mixture of these elastomers may be used. In particular, a highly polar elastomer which readily produces free radicals during mixing of the elastomer, such as natural rubber (NR) or nitrile rubber (NBR), is preferable. An elastomer having a low polarity, such as ethylene propylene rubber (EPDM), may also be used in the invention, since such an elastomer also produces free radicals by setting the mixing temperature at a relatively high temperature (e.g. 50 to 150° C. for EPDM).

As the elastomer, an epoxidized elastomer, which is an elastomer including an epoxy group, is particularly preferable. Since the epoxidized elastomer includes an epoxy group having excellent affinity to the terminal radical of the carbon nanofiber, the carbon nanofibers can be uniformly dispersed in the elastomer. As the epoxidized elastomer, an elastomer including an epoxy group in the polymer, such as epoxidized natural rubber, an epoxidized styrene thermoplastic elastomer (e.g. E-SBS), a terminal epoxy-modified styrene-butadiene rubber (E-SBR), or the like may be used. The epoxidation rate of the epoxidized elastomer is preferably 0.01 to 10%, and particularly preferably 0.5 to 3%. If the amount of epoxy groups is less than 0.01%, the effect of improving the dispersibility of the carbon nanofibers is small. If the amount of epoxy groups exceeds 10%, the elastomer becomes hard to exhibit poor processability.

The elastomer according to this embodiment may be a rubber elastomer or a thermoplastic elastomer. When using a rubber elastomer, an uncrosslinked elastomer is preferably used.

The carbon nanofibers are described below.

The carbon nanofibers preferably have an average diameter of 0.5 to 500 nm. In order to increase the strength of the thermosetting resin composition, the average diameter of the carbon nanofibers is still more preferably 0.5 to 30 nm.

The aspect ratio of the carbon nanofibers is preferably 50 or more, and still more preferably 100 to 20,000.

As examples of the carbon nanofiber, a carbon nanotube and the like can be given. The carbon nanotube has a single-wall structure in which a graphene sheet of a hexagonal carbon layer is closed in the shape of a cylinder, or a multiwall structure in which the cylindrical structures are nested. Specifically, the carbon nanotube may be formed only of either the single-wall structure or the multi-layer structure, or may have the single-wall structure and the multiwall structure in combination. A carbon material having a partial carbon nanotube structure may also be used. The carbon nanotube may also be called a graphite fibril nanotube.

A single-wall carbon nanotube or a multiwall carbon nanotube is produced to a desired size using an arc discharge method, laser ablation method, vapor-phase growth method, or the like.

In the arc discharge method, an arc is discharged between electrode materials made of carbon rods in an argon or hydrogen atmosphere at a pressure lower than atmospheric pressure to a small extent to obtain a multiwall carbon nanotube deposited on the cathode. When a catalyst such as nickel/cobalt is mixed into the carbon rod and an arc is discharged, a single-wall carbon nanotube is obtained from soot adhering to the inner side surface of the processing vessel.

In the laser ablation method, a target carbon surface into which a catalyst such as nickel/cobalt is mixed is irradiated with strong pulse laser light from a YAG laser in a noble gas (e.g. argon) to melt and vaporize the carbon surface to obtain a single-wall carbon nanotube.

In the vapor-phase growth method, a carbon nanotube is synthesized by thermally decomposing a hydrocarbon such as benzene or toluene in a vapor phase. As specific examples of the vapor-phase growth method, a floating catalyst method, zeolite-supported catalyst method, and the like can be given.

The carbon nanofibers may be provided with improved adhesion to and wettability with the elastomer by subjecting the carbon nanofibers to a surface treatment such as an ion-injection treatment, sputter-etching treatment, or plasma treatment before mixing the carbon nanofibers into the elastomer.

The method (1) of producing a thermosetting resin composition according to this embodiment is described below.

The step (a) of mixing the carbon nanofibers into the elastomer and dispersing the carbon nanofibers by applying a shear force to obtain a composite elastomer is described below.

The step (a) may be carried out by using an open-roll method, an internal mixing method, a multi-screw extrusion kneading method, or the like.

In this embodiment, an example using a open-roll method with a roll distance of 0.5 mm or less is described as the step (a).

FIG. 1 is a diagram schematically showing the open-roll method using two rolls. In FIG. 1, a reference numeral 10 indicates a first roll, and a reference numeral 20 indicates a second roll. The first roll 10 and the second roll 20 are disposed at a predetermined distance d (e.g. 1.5 mm). The first and second rolls are rotated normally or reversely. In the example shown in FIG. 1, the first roll 10 and the second roll 20 are rotated in the directions indicated by the arrows.

When causing an elastomer 30 to be wound around the second roll 20 while rotating the first and second rolls 10 and 20, a bank 32 of the elastomer 30 is formed between the rolls 10 and 20. After the addition of carbon nanofibers 40 to the bank 32, the first and second rolls 10 and 20 are rotated to obtain a mixture of the elastomer and the carbon nanofibers. The mixture is then removed from the open rolls. After setting the distance d between the first roll 10 and the second roll 20 at preferably 0.5 mm or less, and still more preferably 0.1 to 0.5 mm, the mixture of the elastomer and the carbon nanofibers is supplied to the open rolls and tight-milled to obtain a composite elastomer. Tight milling is preferably performed about ten times, for example. When the surface velocity of the first roll 10 is indicated by V1 and the surface velocity of the second roll 20 is indicated by V2, the surface velocity ratio (V1/V2) of the first roll 10 to the second roll 20 during tight milling is preferably 1.05 to 3.00, and still more preferably 1.05 to 1.2. A desired shear force can be obtained by using such a surface velocity ratio.

This causes a high shear force to be applied to the elastomer 30 so that the aggregated carbon nanofibers 40 are separated in such a manner that the carbon nanofibers 40 are removed by the elastomer molecules one by one and are dispersed in the elastomer 30.

In this step, the elastomer and the carbon nanofibers are mixed at a relatively low temperature of preferably 0 to 50° C., and still more preferably 5 to 30° C. in order to obtain as high a shear force as possible. When using EPDM as the elastomer, it is preferable to perform two-stage mixing steps. In the first mixing step, EPDM and the carbon nanofibers are mixed at a first temperature which is 50 to 100° C. lower than the temperature in the second mixing step in order to obtain as high a shear force as possible. The first temperature is preferably 0 to 50° C., and still more preferably 5 to 30° C. A second temperature of the rolls is set at a relatively high temperature of 50 to 150° C. so that the dispersibility of the carbon nanofibers can be improved.

In this step, free radicals are produced in the elastomer shorn by the shear force and attack the surfaces of the carbon nanofibers, whereby the surfaces of the carbon nanofibers are activated. When using natural rubber (NR) as the elastomer, the natural rubber (NR) molecule is cut while being mixed by the rolls to have a molecular weight lower than the molecular weight before being supplied to the open rolls. Radicals are produced in the cut natural rubber (NR) molecules and attack the surfaces of the carbon nanofibers during mixing, whereby the surfaces of the carbon nanofibers are activated.

Since the elastomer according to this embodiment has the above-described characteristics, specifically, the above-described molecular configuration (molecular length), molecular motion, and chemical interaction with the carbon nanofibers, dispersion of the carbon nanofibers is facilitated. Therefore, a composite elastomer exhibiting excellent dispersibility and dispersion stability (dispersed carbon nanofibers rarely reaggregate) of the carbon nanofibers can be obtained. In more detail, when mixing the elastomer and the carbon nanofibers, the elastomer having an appropriately long molecular length and a high molecular mobility enters the space between the carbon nanofibers, and a specific portion of the elastomer bonds to a highly active site of the carbon nanofiber through chemical interaction. When a high shear force is applied to the mixture of the elastomer and the carbon nanofibers in this state, the carbon nanofibers move accompanying the movement of the elastomer, whereby the aggregated carbon nanofibers are separated and dispersed in the elastomer. The dispersed carbon nanofibers are prevented from reaggregating due to chemical interaction with the elastomer, whereby excellent dispersion stability can be obtained.

In the step (a), the above-mentioned internal mixing method or multi-screw extrusion kneading method may be used instead of the open-roll method. In other words, it suffices that this step apply a shear force to the elastomer sufficient to separate the aggregated carbon nanofibers and produce radicals by cutting the elastomer molecules.

In the step (a) of dispersing the carbon nanofibers in the elastomer, or in the subsequent step, a compounding ingredient usually used in the processing of an elastomer such as rubber may be added. As the compounding ingredient, a known compounding ingredient may be used. It is preferable that the composite elastomer be uncrosslinked. A crosslinking agent may be mixed into the composite elastomer and crosslinked in the step (b) in order to improve collapse resistance and creep properties depending on the product application, for example.

The composite elastomer obtained by the step (a) is described below.

Figure 2:
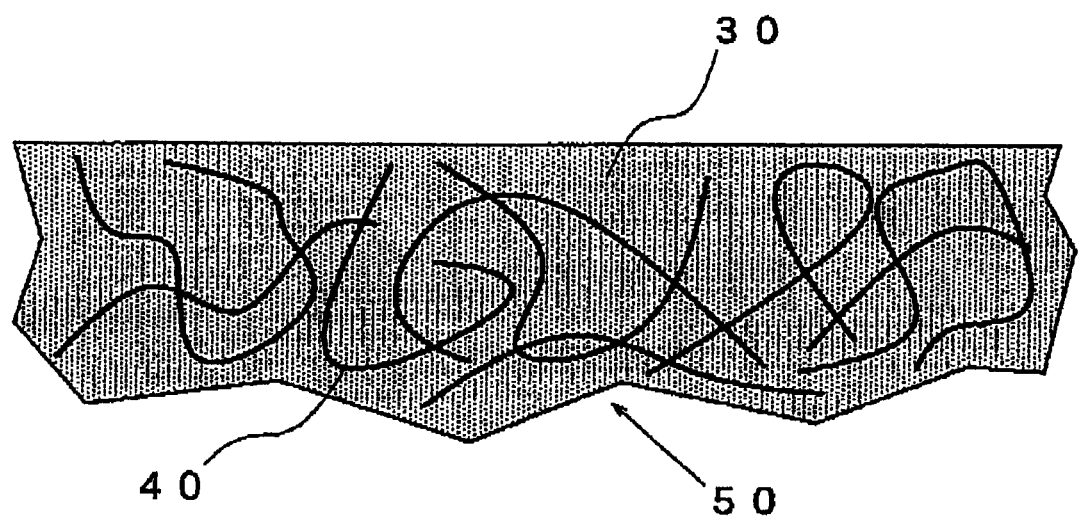
FIG. 2 is a schematic enlarged view showing part of a composite elastomer according to one embodiment of the invention.

FIG. 2 is a schematic enlarged view showing part of the composite elastomer according to this embodiment. In a composite elastomer 50, the carbon nanofibers 40 are uniformly dispersed in the elastomer 30 as the matrix. In other words, the elastomer 30 is restrained by the carbon nanofibers 40. In this state, the mobility of the elastomer molecules restrained by the carbon nanofibers is low in comparison with the case where the elastomer molecules are not restrained by the carbon nanofibers.

The composite elastomer according to this embodiment preferably includes the elastomer and 15 to 50 vol % of the carbon nanofibers dispersed in the elastomer. If the amount of carbon nanofibers in the composite elastomer is less than 15 vol %, the amount of carbon nanofibers in the thermosetting resin composition is decreased, whereby a sufficient effect may not be obtained. If the amount of carbon nanofibers in the composite elastomer exceeds 50 vol %, processing in the step (a) becomes difficult.

The composite elastomer mat include or may not include a crosslinking agent depending on the application. When the composite elastomer does not include a crosslinking agent, since the matrix is not crosslinked when forming the thermosetting resin composition, the matrix can be recycled.

In the composite elastomer according to this embodiment, the carbon nanofibers are uniformly dispersed in the elastomer as the matrix. In other words, the elastomer is restrained by the carbon nanofibers. In this state, the mobility of the elastomer molecules restrained by the carbon nanofibers is low in comparison with the case where the elastomer molecules are not restrained by the carbon nanofibers. Therefore, the first spin-spin relaxation time (T2n), the second spin-spin relaxation time (T2nn), and the spin-lattice relaxation time (T1) of the composite elastomer according to this embodiment are shorter than those of the elastomer which does not include the carbon nanofibers.

In a state in which the elastomer molecules are restrained by the carbon nanofibers, the number of non-network components (non-reticulate chain components) is considered to be reduced for the following reasons. Specifically, when the molecular mobility of the elastomer is entirely decreased by the carbon nanofibers, since the number of non-network components which cannot easily move is increased, the non-network components tend to behave in the same manner as the network components. Moreover, since the non-network components (terminal chains) easily move, the non-network components tend to be adsorbed on the active sites of the carbon nanofibers. It is considered that these phenomena decrease the number of non-network components. Therefore, the fraction (fnn) of components having the second spin-spin relaxation time is smaller than that of the elastomer which does not include the carbon nanofibers.

Therefore, the composite elastomer according to this embodiment preferably has values measured by the Hahn-echo method using the pulsed NMR technique within the following range.

Specifically, it is preferable that, in the uncrosslinked composite elastomer, the first spin-spin relaxation time (T2n) measured at 150° C. be 100 to 3,000 microseconds, the second spin-spin relaxation time (T2nn) measured at 150° C. be 1,000 to 10,000 microseconds, and the fraction (fnn) of components having the second spin-spin relaxation time be less than 0.2.

It is preferable that, in the crosslinked composite elastomer, the first spin-spin relaxation time (T2n) measured at 150° C. be 100 to 2,000 microseconds, the second spin-spin relaxation time (T2nn) measured at 150° C. be absent or 1,000 to 5,000 microseconds, and the fraction (fnn) of components having the second spin-spin relaxation time be less than 0.2.

The spin-lattice relaxation time (T1) measured by the inversion recovery method using the pulsed NMR technique is a measure indicating the molecular mobility of a substance together with the spin-spin relaxation time (T2). In more detail, the shorter the spin-lattice relaxation time of the elastomer, the lower the molecular mobility and the harder the elastomer. The longer the spin-lattice relaxation time of the elastomer, the higher the molecular mobility and the softer the elastomer. Therefore, the composite elastomer in which the carbon nanofibers are uniformly dispersed exhibits low molecular mobility which falls within the above T2n, T2nn, and fnn ranges.

The composite elastomer according to this embodiment preferably has a flow temperature, determined by temperature dependence measurement of dynamic viscoelasticity, 20° C. or more higher than the flow temperature of the raw material elastomer. In the composite elastomer according to this embodiment, the carbon nanofibers are uniformly dispersed in the elastomer. In other words, the elastomer is restrained by the carbon nanofibers, as described above. In this state, the elastomer exhibits molecular motion smaller than that of an elastomer which does not include the carbon nanofibers, whereby flowability is decreased.

The step (b) of mixing the composite elastomer and the thermosetting resin is described below.

The step (b) may be carried out by using the open-roll method, the internal mixing method, the multi-screw extrusion kneading method, or the like in the same manner as the step (b). For example, when carrying out the step (b) by the multi-screw extrusion kneading method using a twin-screw extruder, the thermosetting resin and the composite elastomer are supplied to the twin-screw extruder, and melted and mixed. The composite elastomer is dispersed in the thermosetting resin by rotating the screws of the twin-screw extruder. The thermosetting resin composition is extruded from the twin-screw extruder. The extruded thermosetting resin composition may be cured by heating under predetermined heating conditions of the thermosetting resin used. A crosslinking agent may be added to the twin-screw extruder in the step (b), or a crosslinking agent may be added in advance in the step (a), and the composite elastomer may be crosslinked. For example, the cured thermosetting resin composition may be crosslinked by heating the thermosetting resin composition at a crosslinking temperature.

As the elastomer used in the step (a), an appropriate elastomer which exhibits excellent mutual solubility with the thermosetting resin used in the step (b) is preferably selected. For when the thermosetting resin is an epoxy resin, the elastomer is preferably an epoxidized elastomer such as epoxidized styrene-butadiene rubber (E-SBS). When the thermosetting resin is a phenol resin, the elastomer is preferably NBR or E-SBS.

The amount of the composite elastomer in the thermosetting resin composition is preferably 2 vol % to 50 vol %. The amount of the Carbon nanofibers in the thermosetting resin composition is preferably 0.3 vol % to 25 vol %. If the amount of the composite elastomer in the thermosetting resin composition is less than 2 vol %, the amount of carbon nanofibers in the thermosetting resin composition is decreased, whereby a sufficient effect may not be obtained. If the amount of the composite elastomer in the thermosetting resin composition exceeds 50 vol %, the processing in the step (b) becomes difficult.

The method (2) of producing a thermosetting resin composition according to this embodiment is described below.

The step (c) of mixing the thermosetting resin and the elastomer and the step (d) of mixing the carbon nanofibers into the mixture of the thermosetting resin and the elastomer, and dispersing the carbon nanofibers by applying a shear force are described below.

The step (c) may be carried out using the open-roll method using a resin roll, the internal mixing method, the multi-screw extrusion kneading method, or the like. Since the liquid thermosetting resin (base resin) is mixed with the elastomer, a mixer (processing machine) is selected depending on the viscosity. When using the liquid thermosetting resin as in this embodiment, an internal mixer such as a Henschel mixer is preferable. An open roll using three rolls or two rolls may also be used. For example, when carrying out the step (c) by the multi-screw extrusion kneading method using a twin-screw extruder, the thermosetting resin and the elastomer are supplied to the twin-screw extruder, and melted and mixed. The elastomer is dispersed in the thermosetting resin by rotating the screws of the twin-screw extruder. When carrying out the step (c) using an open roll with two rolls, the rolls are rotated at a roll distance of preferably 0.5 to 5 mm (e.g. 1.0 mm) to caused the elastomer to be wound around one of the rolls. After the addition of the thermosetting resin to the bank, the elastomer and the thermosetting resin are mixed. When carrying out the mixing step (c) at a low temperature, a curing agent may be added in the step (c). In this case, the rotational speed of one of the rolls is 20 rpm, and the rotational speed of the other roll is 22 rpm, for example. This caused the elastomer and the thermosetting resin to be mixed to obtain a sheet-shaped mixture.

In the step (d), the carbon nanofibers are supplied to and mixed into the mixture of the thermosetting resin and the elastomer provided in the twin-screw extruder in a molten state. A high shear force is applied to the mixture by rotating the screws, whereby the aggregated carbon nanofibers are separated so that the carbon nanofibers are pulled one by one by the elastomer molecules in the mixture, and dispersed in the mixture. The thermosetting resin composition is then extruded from the twin-screw extruder. The extruded thermosetting resin composition may be cured by heating under predetermined heating conditions of the thermosetting resin used. A crosslinking agent may be added to the twin-screw extruder in the step (c) or (d), and the composite elastomer may be crosslinked. For example, the cured thermosetting resin composition may be crosslinked by heating the thermosetting resin composition at a crosslinking temperature. For example, when carrying out the step (d) using an open roll after the step (c), After the addition of the carbon nanofibers to the bank of the mixture, the mixture and the carbon nanofibers are mixed by rotating the two rolls, and the mixture is tight-milled a number of times. In this case, the rotational speed of the roll is the same as in the step (c). After reducing the roll distance to preferably 0.1 mm to 0.5 mm (e.g. 0.1 mm), the rolls are rotated (the roll surface rotational speed ratio is 1.1, for example). This causes a high shear force to be applied to the mixture discharged from the rolls. The shear force causes the aggregated carbon nanofibers to be separated so that the carbon nanofibers are pulled one by one and to be dispersed in the mixture. After increasing the roll surface rotational speed ratio 1.3 (e.g. 26 rpm/20 rpm), the mixture is rolled at a roll distance of 0.5 mm, for example, to obtain a sheet-shaped thermosetting resin composition.

In the step of curing the thermosetting resin composition, a general thermosetting resin molding method may be employed. For example, the thermosetting resin composition including a curing agent may be placed in a mold heated at a specific temperature, and compression-molded at a specific pressure. Or, the thermosetting resin composition may be molded using a transfer molding machine or the like. The molding temperature and the molding time may be appropriately set depending on the types of selected thermosetting resin and curing agent. In the thermosetting resin composition pressurized in the heated mold for a specific period of time, the epoxy resin is crosslinked and cured due to the presence of the curing agent. The thermosetting resin composition is then removed from the mold.

As the elastomer used in the steps (c) and (d), an appropriate elastomer which exhibits excellent mutual solubility with the thermosetting resin is preferably selected in the same manner as in the steps (a) and (b). For when the thermosetting resin is an epoxy resin, the elastomer is preferably an epoxidized elastomer such as epoxidized styrene-butadiene rubber (E-SBS). When the thermosetting resin is a phenol resin, the elastomer is preferably NBR or E-SBS.

The elastomer content in the polymer component (i.e. the elastomer, the thermosetting resin, and the curing agent for the thermosetting resin) in the thermosetting resin composition is preferably 10 to 40 wt %. This provides a rigid thermosetting resin composition in which the carbon nanofibers are uniformly dispersed. If the elastomer content in the polymer component is less than 10 wt %, the dispersion of the carbon nanofiber becomes insufficient. If the elastomer content exceeds 40 wt %, the rigidity of the thermosetting resin composition is decreased.

The carbon nanofiber content in the thermosetting resin composition preferably 0.3 to 45 wt %, and still more preferably 8 to 30 wt %. If the carbon nanofiber content is less than 0.3 wt %, the rigid of the thermosetting resin composition is not sufficiently increased. If the carbon nanofiber content exceeds 45 wt %, processing becomes difficult to too high a rigidity.

The thermosetting resin composition is described below.

The thermosetting resin composition according to this embodiment includes the matrix including the thermosetting resin and the elastomer, and the carbon nanofibers dispersed in the matrix, the elastomer including an unsaturated bond or a group having affinity to the carbon nanofibers.

The thermosetting resin composition exhibits improved strength, rigidity, durability, and the like in comparison with the thermosetting resin, since the carbon nanofibers are uniformly dispersed in the matrix. The thermosetting resin composition exhibits improved impact resistance due to incorporation of the elastomer component. In particular, a thermosetting resin composition in which the thermosetting resin is an epoxy resin and the elastomer is an epoxidized elastomer preferably has a high rigidity with a dynamic modulus of elasticity (E') at 30° C. of 20 to 30 GPa and an elongation at break of 4% or more.

EXAMPLES

Examples according to the invention and comparative examples are described below. Note that the invention is not limited to the following examples. (Examples 1 to 7 and Comparative Examples 1 to 3)
(1) Preparation of Sample
Step (c)
An epoxidized elastomer was supplied to a 6-inch open roll (roll temperature: 10 to 50° C.) and wound around the roll. An epoxy resin (base resin) was supplied to and mixed with the epoxidized elastomer to obtain a first mixture. The roll distance was set at 1 mm, and the roll rotational speed was set at 22 rpm/20 rpm. The types and amounts (phr) of the epoxidized elastomer and the epoxy resin are shown in Tables 1 and 2.
Step (d)
A filler was supplied to and mixed with the first mixture. After reducing the roll distance to 0.1 mm, the mixture was tight-milled five times to obtain a second mixture. The roll rotational speed was set at 22 rpm/20 rpm. After setting the roll distance at 1 mm and the roll rotational speed at 22 rpm/20 rpm, the second mixture was supplied to the open roll. A curing agent was then supplied to and mixed with the second mixture. The type and amount (phr) of the filler are shown in Tables 1 and 2. The roll temperature was set at 10° C. to 50° C.

The second mixture including the curing agent was removed from the open roll and placed in a mold with a thickness of 2 mm. The second mixture was press-molded at 150° C. for five minutes at a pressure of 10 MPa to obtain a cured (crosslinked) thermosetting resin composition sample.
In Tables 1 and 2, the base resin "Epikote 828" of the epoxy resin is a bisphenol A type epoxy resin manufactured by Japan Epoxy Resins Co., Ltd. (viscosity: 120 to 150 poise/25° C., epoxy equivalent: 172 to 178). In Tables 1 and 2, the curing agent "Amicure VDH" for the epoxy resin is a hydrazide curing agent manufactured by Ajinomoto fine Techno Co., Inc. (white powder, melting point: 120° C.). In Tables 1 and 2, the epoxidized elastomer "E-SBS" is an epoxidized styrene-butadiene block copolymer manufactured by Daicel Chemical Industries, Ltd. (Epofriend A1005 (molecular weight 100, 000, epoxidation rate: 1.7%)). In Tables 1 and 2, "CNT3" is a multi-wall carbon nanotube (CVD) with an average diameter of 13 nm (manufactured by ILJIN Nanotech Co., Ltd.), and "HAF" is HAF grade carbon black with an average diameter of 27 nm.

In Tables 1 and 2, the "elastomer content (wt %)" is the content of the epoxidized elastomer in the polymer component (base resin+curing agent+epoxidized elastomer), and the "filler content (wt %)" is the content of the filler in the thermosetting resin composition (epoxy resin+epoxidized elastomer+filler).
(2) Measurement of tensile strength (MPa)
A specimen prepared by cutting each sample in the shape of a 1A dumbbell was subjected to a tensile test in accordance with JIS K7161 at a temperature of 23±2° C. and a tensile rate of 500 mm/min using a tensile tester manufactured by Toyo Seiki Seisaku-sho, Ltd. to measure the tensile strength (MPa). The results are shown in Tables 1 and 2.
(3) Measurement of elongation at break (%)
A specimen prepared by cutting each sample in the shape of a dumbbell in accordance with JIS-K6251-1993 was subjected to a tensile fracture test at a temperature of 23±2° C. and a tensile rate of 500 mm/min using a tensile tester manufactured by Toyo Seiki Seisaku-sho, Ltd. to measure the elongation at break (%). The results are shown in Tables 1 and 2.
(4) Measurement of dynamic modulus of elasticity (GPa)
A specimen prepared by cutting each sample in the shape of a strip (40×1×5 (width) mm) was subjected to a dynamic viscoelasticity test at a chuck distance of 20 mm, a temperature of 30° C., a dynamic strain of ±0.05, and a frequency of 10 Hz using a dynamic viscoelasticity testing machine DMS6100 manufactured by SII to measure the dynamic modulus of elasticity (E') at 30° C. The results are shown in Tables 1 and 2.
(5) Measurement using pulsed NMR technique
Each epoxidized elastomer was subjected to measurement by the Hahn-echo method using the pulsed NMR technique. The measurement was conducted using "JMN-MU25" manufactured by JEOL, Ltd. The measurement was conducted under conditions of an observing nucleus of $^1$H, a resonance frequency of 25 MHz, and a 90-degree pulse width of 2 microseconds, and a decay curve was determined while changing Pi in the pulse sequence (90° x-Pi-180° x) of the Hahn-echo method. The sample was measured in a state in which the sample was inserted into a sample tube within an appropriate magnetic field range. The measurement temperature was 30° C. The first component (T2n) of the spin-spin relaxation time of the epoxidized elastomer was measured by this measurement. The spin-spin relaxation time (T2n) of the epoxidized elastomer "E-SBS" was 860 (microsecond).

TABLE 1

|  |  |  | Example 1 | Example 2 | Example 3 | Example 4 | Example 5 | Example 6 | Example 7 |
|---|---|---|---|---|---|---|---|---|---|
| Epoxy resin | Base resin | Epikote 82 (phr) | 100 | 100 | 100 | 100 | 100 | 100 | 100 |
|  | Curing agent | Amicur VDH (phr) | 40 | 40 | 40 | 40 | 40 | 40 | 40 |
| Epoxidized elastomer |  | E-SBS (phr) | 50 | 50 | 20 | 80 | 50 | 50 | 100 |
| T2n of elastomer (30° C.) (microsecond) |  |  | 860 | 860 | 860 | 860 | 860 | 860 | 860 |
| Elastomer content (wt %) |  |  | 26.3 | 26.3 | 12.5 | 36.4 | 26.3 | 26.3 | 41.7 |
| Filler | CNT | CNT13 (phr) | 40 | 20 | 20 | 20 | 80 | 100 | 20 |
|  | CB | HAF (phr) | 0 | 0 | 0 | 0 | 0 | 0 | 0 |
| Filler content (wt %) |  |  | 17.4 | 9.5 | 11.1 | 8.3 | 29.6 | 34.5 | 7.7 |
| Properties of thermosetting resin composition | Tensil strength (MPa) |  | 33 | 41 | 37 | 48 | 48 | 30 | 28 |
|  | Elongation at break (%) |  | 6 | 8 | 7 | 16 | 4 | 2 | 25 |
|  | Modulus of elasticity E'(30° C.) (GPa) |  | 21 | 25 | 29 | 20 | 29 | 22 | 18 |

TABLE 2

|  |  |  | Comparative Example 1 | Comparative Example 2 | Comparative Example 3 |
|---|---|---|---|---|---|
| Epoxy resin | Base resin | Epikote 828 (phr) | 100 | 100 | 100 |
|  | Curing agent | Amicure VDH (phr) | 40 | 40 | 40 |
| Epoxidized elastomer |  | E-SBS (phr) | 0 | 50 | 50 |
|  |  | T2n of elastomer (30° C.) (microsecond) | 0 | 860 | 860 |
|  |  | Elastomer content (wt %) | 0.0 | 26.3 | 26.3 |
| Filler | CNT | CNT13 (phr) | 0 | 0 | 0 |
|  | CB | HAF (phr) | 0 | 0 | 50 |
| Filler content (wt %) |  |  | 0.0 | 0.0 | 20.8 |
| Properties of thermosetting resin composition |  | Tensile strength (MPa) | 30 | 15 | 13 |
|  |  | Elongation at break (%) | 2 | 8 | 6 |
|  |  | Modulus of elasticity E'(30° C.) (GPa) | 18 | 3.8 | 19 |

As shown in Tables 1 and 2, the dynamic modulus of elasticity in Examples 1 to 7 using the multi-wall carbon nanotube (CNT13) was higher than those of Comparative Examples 1 and 2 in which a filler was not used and Comparative Example 3 using another filler (carbon black). The dynamic modulus of elasticity was 20 GPa or more even in Example 4 in which the carbon nanofiber content was 8.3 wt %. Moreover, the thermosetting resin compositions of Examples 1 to 7 exhibited flexibility due to incorporation of a moderate amount of the epoxidized elastomer. In particular, the thermosetting resin compositions of Examples 1 to 5 and 7 exhibited an elongation at break of 4% or more. In Example 6 with a carbon nanofiber content of 34.5 wt %, the elongation at break was as small as 2%. In Example 7 with a carbon nanofiber content of less than 8 wt %, the dynamic modulus of elasticity was less than 20 GPa.

From the above results, it was confirmed that the thermosetting resin composition according to the invention exhibits high rigidity and high flexibility.

Although only some embodiments of the invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A method of producing a thermosetting resin composition comprising:
   (1) mixing a thermosetting resin and an elastomer including an unsaturated bond or a group having affinity to carbon nanofibers; and
   (2) mixing carbon nanofibers into the mixture of the thermosetting resin and the elastomer, and uniformly dispersing the carbon nanofibers by applying a shear force, wherein:
   the carbon nanofiber content of the thermosetting resin composition is 8 wt % to 30 wt %;
   a curing agent is added in the step (1) or the step (2); and
   the elastomer content in a polymer component containing the curing agent, the thermosetting resin, and the elastomer is 10 wt % to 40 wt %.

2. The method of producing a thermosetting resin composition as defined in claim 1, wherein the carbon nanofibers have an average diameter of 0.5 to 500 nm.

3. The method of producing a thermosetting resin composition as defined in claim 1, wherein a network component of the elastomer in an uncrosslinked form has a spin-spin relaxation time (T2n) measured at 30° C. by a Hahn-echo method using a pulsed nuclear magnetic resonance (NMR) technique of 100 to 3,000 microseconds.

4. The method of producing a thermosetting resin composition as defined in claim 1, wherein the thermosetting resin is an epoxy resin; and wherein the elastomer is an epoxidized elastomer.

5. The method of producing the thermosetting resin composition as defined in claim 1, wherein the carbon nanofiber content of the thermosetting resin composition is 9.5 wt % to 29.6 wt %.

6. The method of producing the thermosetting resin composition as defined in claim 1, wherein the carbon nanofiber content of the thermosetting resin composition is 11.1 wt % to 29.6 wt %.

7. The method of producing the thermosetting resin composition as defined in claim 1, wherein the elastomer content in the polymer component is 12.5 wt % to 26.3 wt %.

8. The method of producing the thermosetting resin composition as defined in claim 1, wherein the elastomer content in the polymer component is 26.3 wt % to 40 wt %.

9. The method of producing a thermosetting resin composition as defined in claim 1, wherein step (1) is performed by using an open-roll method.

10. The method of producing the thermosetting resin composition as defined in claim 9, wherein step (2) is performed by using an open-roll method.

* * * * *